(12) United States Patent
Zheng

(10) Patent No.: US 11,705,584 B2
(45) Date of Patent: Jul. 18, 2023

(54) ADDITIVES FOR IMPROVING BATTERY PERFORMANCE VIA SECOND ELECTRON DISCHARGE OF MANGANESE DIOXIDE

(71) Applicant: Energizer Brands, LLC, St. Louis, MO (US)

(72) Inventor: Guanghong Zheng, Westlake, OH (US)

(73) Assignee: Energizer Brands, LLC, St. Louis, MO (US)

( * ) Notice: Subject to any disclaimer, the term of this patent is extended or adjusted under 35 U.S.C. 154(b) by 161 days.

(21) Appl. No.: 15/902,705

(22) Filed: Feb. 22, 2018

(65) Prior Publication Data

US 2018/0248231 A1  Aug. 30, 2018

Related U.S. Application Data

(60) Provisional application No. 62/462,622, filed on Feb. 23, 2017.

(51) Int. Cl.
| | | |
|---|---|---|
| *H01M 10/42* | (2006.01) | |
| *H01M 6/04* | (2006.01) | |
| *H01M 10/24* | (2006.01) | |
| *H01M 4/26* | (2006.01) | |
| *H01M 4/62* | (2006.01) | |
| *H01M 6/50* | (2006.01) | |
| *H01M 50/403* | (2021.01) | |

(52) U.S. Cl.
CPC ......... *H01M 10/4235* (2013.01); *H01M 4/26* (2013.01); *H01M 4/62* (2013.01); *H01M 6/045* (2013.01); *H01M 6/50* (2013.01); *H01M 10/24* (2013.01); *H01M 50/403* (2021.01); *H01M 2220/30* (2013.01); *H01M 2300/0014* (2013.01)

(58) Field of Classification Search
CPC ............ H01M 10/4235; H01M 10/24; H01M 50/403; H01M 4/24; H01M 4/26; H01M 4/36; H01M 4/62; H01M 6/045; H01M 6/50; H01M 2220/30; H01M 2300/0014
See application file for complete search history.

(56) References Cited

U.S. PATENT DOCUMENTS

| 3,110,630 | A | * | 11/1963 | Wolfe, Jr. | ............... | H01M 4/60 |
| | | | | | | 429/105 |
| 4,777,100 | A | * | 10/1988 | Chalilpoyil | ............. | H01M 4/38 |
| | | | | | | 429/206 |
| 9,225,015 | B2 | | 12/2015 | Lee et al. | | |
| 2011/0159360 | A1 | * | 6/2011 | Hirota | .................. | H01M 4/624 |
| | | | | | | 429/206 |

(Continued)

FOREIGN PATENT DOCUMENTS

JP  2010080397  A  *  4/2010

OTHER PUBLICATIONS

JP-2010080397-A Nogami et al., Espacenet English translation (Year: 2010).*

(Continued)

*Primary Examiner* — William E McClain
*Assistant Examiner* — Kirsten B Tysl
(74) *Attorney, Agent, or Firm* — Alston & Bird LLP

(57) ABSTRACT

Alkaline electrochemical cells are provided, wherein an organic additive is included in at least one component of the cell in order to increase electron discharge of the cathode, so as to improve the specific capacity of the cell. Methods for preparing such cells are also provided.

23 Claims, 11 Drawing Sheets

(56) References Cited

U.S. PATENT DOCUMENTS

2015/0155559 A1 6/2015 Zimmerman et al.
2015/0349344 A1* 12/2015 Shelekhin ............ H01M 6/045
429/90

OTHER PUBLICATIONS

Donne, S. W., et al., "Redox Processes at the Manganese Dioxide Electrode I. Constant-Current Intermittent Discharge," J. Electrochem. Soc., 144, 2949 (1997).

Donne, S. W., et al., "Redox Processes at the Manganese Dioxide Electrode II. Slow-Scan Cyclic Voltammetry," J. Electrochem. Soc., 144, 2954 (1997)).

Donne, S. W., et al., "Redox Processes at the Manganese Dioxide Electrode III. Detection of Soluble and Solid Intermediates during Reduction," J. Electrochem. Soc., 144, 2961 (1997)).

Kozawa, A., et al., "Solubilities of Mn(II) and Mn(III) Ions in Concentrated Alkaline Solutions," J. Electrochem. Soc., 113, 405 (1966).

Kozawa, A., et al., "The Cathodic Reduction Mechanism of Electrolytic Manganese Dioxide in Alkaline Electrolyte," J. Electrochem. Soc., 112, 959 (1965).

Kozawa, A., et al., "The Manganese Dioxide Electrode in Alkaline Electrolyte; The Electron-Proton Mechanism for the Discharge Process from $MnO_2$ to $MnO1.5$." J. Electrochem. Soc., 113, 870 (1966).

Manickam, M., et al., "Lithium insertion into manganese dioxide electrode in $MnO_2$/Zn aqueous battery: Part I. A preliminary study," Journal of Power Sources, May 2004, pp. 254-259, vol. 130, Issues 1-2.

Manickam, M., et al., "Lithium insertion into manganese dioxide electrode in $MnO_2$/Zn aqueous battery: Part II. Comparison of the behavior of EMD and battery grade $MnO_2$ in $Zn|MnO_2|$aqueous LiOH electrolyte," Journal of Power Sources, 2004, pp. 319-322, vol. 138.

Manickam, M., et al., "Lithium insertion into manganese dioxide electrode in $MnO_2$/Zn aqueous battery Part III. Electrochemical behavior of $_\lambda$-$MnO_2$ in aqueous lithium hydroxide electrolyte," Journal of Power Sources, 2006, pp. 165-169, vol. 153.

Patrice, R., et al., "Understanding the Second Electron Discharge Plateau in MnO2-Based Alkaline Cells," J. Electrochem. Soc., 148, A448 (2001).

\* cited by examiner

ADDITIVES FOR IMPROVING BATTERY PERFORMANCE VIA SECOND ELECTRON DISCHARGE OF MANGANESE DIOXIDE

CROSS-REFERENCE TO RELATED APPLICATIONS

This application claims priority of U.S. Provisional Application No. 62/462,622, filed Feb. 23, 2017, which is hereby incorporated by reference herein in its entirety.

BACKGROUND

Alkaline electrochemical cells are commercially available in cell sizes commonly known as LR6 (AA), LR03 (AAA), LR14 (C) and LR20 (D). The cells have a cylindrical shape that must comply with the dimensional standards that are set by organizations such as the International Electrotechnical Commission. The electrochemical cells are utilized by consumers to power a wide range of electrical devices, for example, clocks, radios, toys, electronic games, film cameras generally including a flashbulb unit, as well as digital cameras. Such electrical devices possess a wide range of electrical discharge conditions, such as from low drain to relatively high drain. Due to the increased use of high drain devices, such as digital cameras, it is desirable for a manufacturer to produce a battery that possesses desirable high drain discharge properties.

As the shape and size of the batteries are often fixed, battery manufacturers must modify cell characteristics to provide increased performance. Attempts to address the problem of how to improve a battery's performance in a particular device, such as a digital camera, have usually involved changes to the cell's internal construction. For example, cell construction has been modified by increasing the quantity of active materials utilized within the cell.

Manganese dioxide ($MnO_2$) is a well-known substance commonly used in electrochemical cells, such as dry cell batteries, as an active cathode material, often in the form of electrolytic manganese dioxide (EMD). Zinc (Zn) is a common active anode material.

$MnO_2$ cathode utilization is still limited to a one electron discharge described in the following reaction:

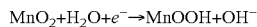

$$MnO_2 + H_2O + e^- \rightarrow MnOOH + OH^-$$

(See R. Patrice, et al, "Understanding the Second Electron Discharge Plateau in $MnO_2$-Based Alkaline Cells," J. Electrochem. Soc., 148, A448 (2001), and A. Kozawa and J. F. Yeager, "The Cathodic Reduction Mechanism of Electrolytic Manganese Dioxide in Alkaline Electrolyte," J. Electrochem. Soc., 112, 959 (1965).)

Efforts have been made to produce batteries which have a two-electron discharge of manganese dioxide, which would allow for improved capacity. It is in an effort to overcome the limitations of the above-described cells, and other such cells, that the present embodiments were designed.

BRIEF SUMMARY

An embodiment is an alkaline electrochemical cell, comprising:
a) a container; and
b) an electrode assembly disposed within the container and comprising a cathode, an anode, a separator located between the cathode and the anode, an alkaline electrolyte solution, and an organic additive.

An embodiment is a method of producing the electrochemical cell of any above embodiment, wherein the cathode comprises the organic additive, comprising the step of
i) blending the organic additive with cathode mix prior to forming the cathode.

An embodiment is a method of producing the electrochemical cell of any above embodiment, wherein the anode comprises the organic additive, comprising the step of
i) adding the organic additive into anode dry mix or anode paste prior to forming the anode.

An embodiment is a method of producing the electrochemical cell of any above embodiment, wherein the electrolyte solution comprises the organic additive, comprising the step of
i) mixing the organic additive with the electrolyte or electrolyte solution.

An embodiment is a method of producing the electrochemical cell of any above embodiment, wherein the separator comprises the organic additive, comprising the step of
i) dipping the separator in organic additive solution; or
ii) placing organic additive powder between layers of separator.

DETAILED DESCRIPTION AND DISCUSSION

Figure 1:
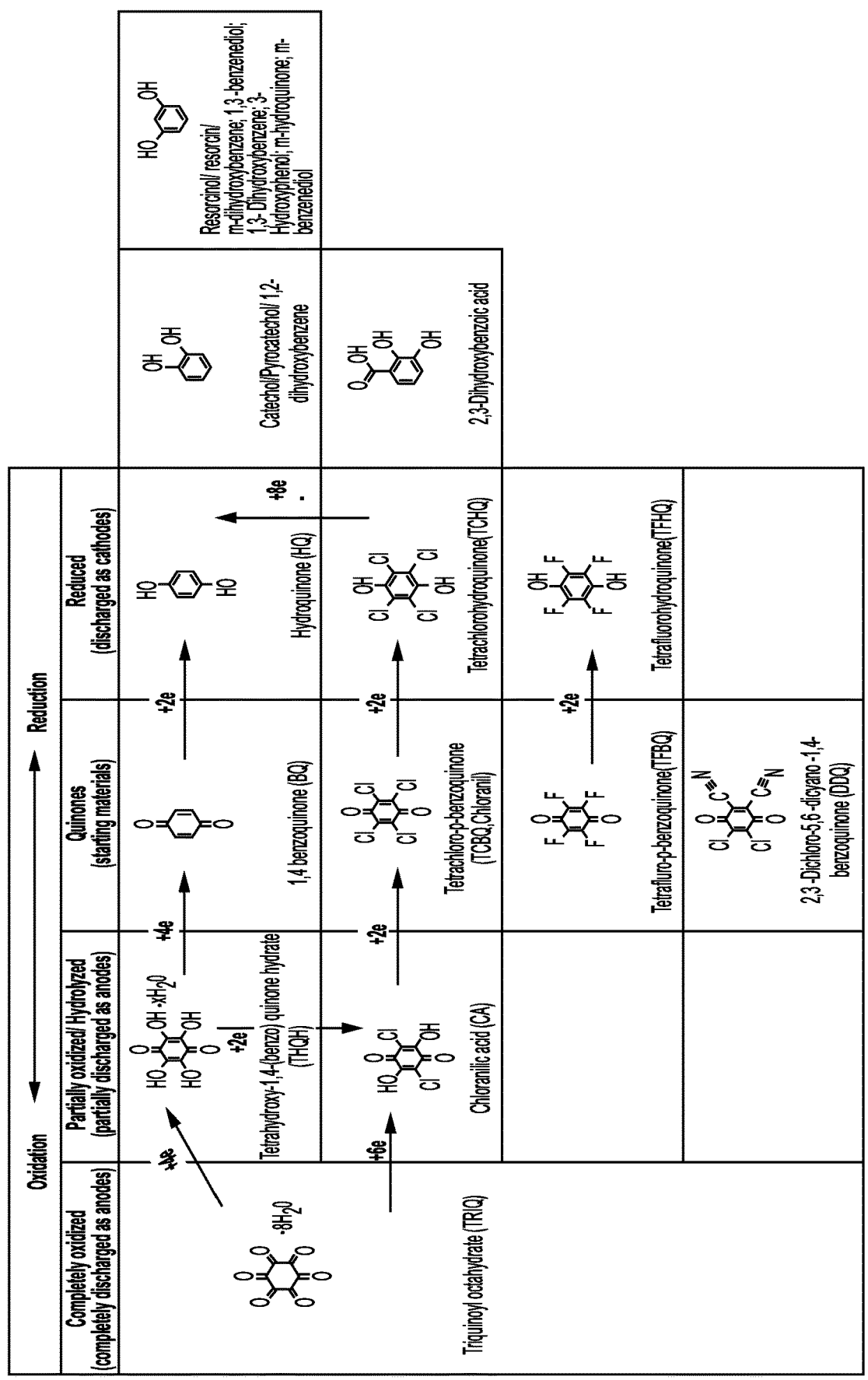
FIG. 1 shows some organic additives that may be added to $MnO_2$.

Various embodiments now will be described more fully hereinafter with reference to the accompanying drawings, in which some, but not all embodiments are shown. Indeed, various embodiments may be embodied in many different forms and should not be construed as limited to the embodiments set forth herein; rather, these embodiments are provided so that this disclosure will satisfy applicable legal requirements. Like numbers refer to like elements throughout. In the following description, various components may be identified as having specific values or parameters, however, these items are provided as exemplary embodiments. Indeed, the exemplary embodiments do not limit the various aspects and concepts of the embodiments as many comparable parameters, sizes, ranges, and/or values may be implemented. The terms "first," "second," and the like, "primary," "exemplary," "secondary," and the like, do not denote any order, quantity, or importance, but rather are used to distinguish one element from another. Further, the terms "a," "an," and "the" do not denote a limitation of quantity, but rather denote the presence of "at least one" of the referenced item. For example, "an organic additive" may refer to two or more organic additives.

Each embodiment disclosed herein is contemplated as being applicable to each of the other disclosed embodiments. All combinations and sub-combinations of the various elements described herein are within the scope of the embodiments.

It is understood that where a parameter range is provided, all integers and ranges within that range, and tenths and hundredths thereof, are also provided by the embodiments. For example, "5-10%" includes 5%, 6%, 7%, 8%, 9%, and 10%; 5.0%, 5.1%, 5.2% . . . 9.8%, 9.9%, and 10.0%; and 5.00%, 5.01%, 5.02% . . . 9.98%, 9.99%, and 10.00%, as well as, for example, 6-9%, 5.1%-9.9%, and 5.01%-9.99%.

As used herein, "about" in the context of a numerical value or range means within ±10% of the numerical value or range recited or claimed.

As used herein, "synergistic," in terms of an effect, refers to the case where an electrochemical cell comprising two organic additives (OA1 and OA2) exhibits a greater improvement in specific capacity, or some other property or metric of performance, compared to an electrochemical cell lacking the organic additives than would be expected based on the improvements exhibited by two electrochemical cells, one comprising OA1 and one comprising OA2.

As used herein, "improvement" with respect to specific capacity means that the specific capacity is increased. Generally, an "improvement" of a property or metric of performance of a material or electrochemical cell means that the property or metric of performance differs (compared to that of a different material or electrochemical cell) in a manner that a user or manufacturer of the material or cell would find desirable (i.e. costs less, lasts longer, provides more power, more durable, easier or faster to manufacture etc.).

As used herein, "specific capacity" refers to the total amount of charge in an electrochemical cell when discharged at a particular rate. This is typically measured in ampere hours.

As used herein, "run-time" refers to the length of time that an electrochemical cell will be able to provide a certain level of charge.

An embodiment is an alkaline electrochemical cell, comprising:
 a) a container; and
 b) an electrode assembly disposed within the container and comprising a cathode, an anode, a separator located between the cathode and the anode, an alkaline electrolyte solution, and an organic additive.

In an embodiment, the organic additive is a quinone, a hydroxyquinone, a triquinoyl, or a hydroquinone. In an embodiment, the organic additive is selected from the group consisting of 2,3-Dichloro-5,6-Dicyano-1,4-Benzoquinone (DDQ), tetracyanoethylene (TCNE), sulfur trioxide, chloranil, chloranilic acid (CA), tetrafluro-p-benzoquinone (TFBQ), triquinoyl octahydrate (TRIQ), tetrahydroxy-1,4-(benzo)quinone hydrate (THQ), 1,4-benzoquinone (BQ), hydroquinone (HQ), tetrachlorohydroquinone (TCHQ), tetrafluorohydroquinone (TFHQ), catechol, 2,3-dihydroxybenzoic acid, 1,3-benzenediol, and combinations thereof. In an embodiment, the organic additive is selected from the group consisting of CA, chloranil, and TFBQ, and combinations thereof.

In an embodiment, the electrochemical cell does not comprise an ionically conducting polymer. In an embodiment, the cathode does not comprise an ionically conducting polymer.

In an embodiment, the cathode comprises the organic additive. In an embodiment, the anode comprises the organic additive. In an embodiment, the electrolyte solution comprises the organic additive. In an embodiment, the separator comprises the organic additive.

In an embodiment, the electrochemical cell is a primary, or disposable, cell. In an embodiment, the electrochemical cell is a secondary, rechargeable, cell.

In an embodiment, the cathode or the anode comprises an organic additive in a concentration of 0.1 wt %-50 wt %, or 0.5 wt %-40 wt %, or 1 wt %-30 wt %, or 2 wt %-20 wt %, or 3 wt %-15 wt %, or 5 wt %-12 wt %, or 7 wt %-9 wt %.

In an embodiment, the electrolyte solution comprises an organic additive in a concentration of 100-30000 ppm, or 200-25000 ppm, or 300-20000 ppm, or 400-15000 ppm, or 500-10000 ppm.

In an embodiment, the organic additive is in powder form, the separator comprises multiple layers, and the organic additive is between layers of separator in an amount of 0.01-5 g, or 0.1-5 g, or 0.2-3 g, or 0.2-2 g, 0.2-1 g, or 0.2-0.5 g.

In an embodiment, the anode comprises an active material selected from the group consisting of zinc, magnesium, aluminum, and silicon.

In an embodiment, the electrolyte solution comprises potassium hydroxide (KOH), sodium hydroxide (NaOH), lithium hydroxide (LiOH), magnesium hydroxide $(Mg(OH)_2)$, $Ca(OH)_2$, magnesium perchlorate $(Mg(ClO_4)_2)$, magnesium chloride $(MgCl_2)$, or magnesium bromide $(MgBr_2)$.

In an embodiment, the electrochemical cell has a specific capacity or runtime that is greater than that of a similar alkaline electrochemical cell which lacks the organic additive(s). In an embodiment, the electrochemical cell comprises an amount of organic additive in the electrolyte solution, and the cell has a specific capacity or runtime that is greater than that of an otherwise similar alkaline electrochemical cell which comprises the same amount of organic additive in either the cathode or the anode. In a further embodiment, the specific capacity or runtime is from 1% greater to 100% greater, or from 5% greater to 90% greater, or from 10% greater to 80% greater, or from 15% greater to 70% greater, or from 20% greater to 60% greater, or from 25% greater to 50% greater, or from 30% greater to 40% greater. In an embodiment, the alkaline electrochemical cell comprises two or more organic additives, and the increase in specific capacity is synergistic.

In an embodiment, the voltage is 0.1 V-2.0 V, 0.2 V-1.9 V, 0.3 V-1.8 V, 0.4V-1.7 V, 0.5 V-1.6 V, 0.6 V-1.5 V, 0.7 V-1.4 V, 0.8 V-1.3 V, 0.9 V-1.2 V, 1.0 V-1.1 V, or is 0.1 V, 0.2 V, 0.3 V, 0.4 V, 0.5 V, 0.6 V, 0.7 V, 0.8 V, 0.9 V, 1.0 V, 1.1 V, 1.2 V, 1.3 V, 1.4 V, 1.5 V, 1.6 V, 1.7 V, 1.8 V, 1.9 V, or 2.0 V.

An embodiment is a method of producing the electrochemical cell of any above embodiment, wherein the cathode comprises the organic additive, comprising the step of
 i) blending the organic additive with cathode mix prior to forming the cathode.

An embodiment is a method of producing the electrochemical cell of any above embodiment, wherein the anode comprises the organic additive, comprising the step of
i) adding the organic additive into anode dry mix or anode paste prior to forming the anode.

An embodiment is a method of producing the electrochemical cell of any above embodiment, wherein the electrolyte solution comprises the organic additive, comprising the step of
i) mixing the organic additive with the electrolyte or electrolyte solution.

An embodiment is a method of producing the electrochemical cell of any above embodiment, wherein the separator comprises the organic additive, comprising the step of
i) dipping the separator in organic additive solution; or
ii) placing organic additive powder between layers of separator.

The second electron discharge, as discussed above, is the formation of manganese hydroxide $Mn(OH)_2$ from manganese oxyhydroxide, MnOOH:

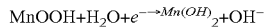
$$MnOOH + H_2O + e^- \xrightarrow{Mn(OH)_2} + OH^-$$

(See S. W. Donne, et al., "Redox Processes at the Manganese Dioxide Electrode II. Slow-Scan Cyclic Voltammetry," J. Electrochem. Soc., 144, 2954 (1997)).

One challenge in getting the $2^{nd}$ electron discharge as described above is that the manganese oxyhydroxide MnOOH tends to react with zincate $Zn(OH)_4^{2-}$ ions, which are diffused from the anode to cathode through the separator to form hetaerolite $ZnMn_2O_4$ via the following reaction:

$$2MnOOH + Zn(OH)_4^{2-} \rightarrow ZnMn_2O_4 + 2H_2O + 2OH^-$$

(See A. Kozawa and R. A. Powers, "The Manganese Dioxide Electrode in Alkaline Electrolyte; The Electron-Proton Mechanism for the Discharge Process from $MnO_2$ to $MnO_{1.5}$." J. Electrochem. Soc., 113, 870 (1966)). The hetaerolite is not electrochemically active and is not able to be further reduced for the $2^{nd}$ electron discharge.

Secondly, it is believed that the manganese hydroxide $Mn(OH)_2$ is formed via the so-called dissolution-precipitation mechanism, as described in the following three reactions:

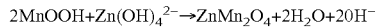
$$MnOOH + H_2O + 3OH^- \xleftrightarrow{dissolution} [Mn(OH)_6]^{3-}$$
$$[Mn(OH)_6]^{3-} + e^- \xleftrightarrow{redox} [Mn(OH)_6]^{4-}$$
$$[Mn(OH)_6]^{4-} \xleftrightarrow{precipitation} Mn(OH)_2\downarrow + 4OH^-$$

(See S. W. Donne, et al., "Redox Processes at the Manganese Dioxide Electrode III. Detection of Soluble and Solid Intermediates during Reduction," J. Electrochem. Soc., 144, 2961 (1997)). The soluble species $Mn^{3+}$ and $Mn^{2+}$ have been alternatively expressed as $[Mn(OH)_4]^-$ and $[Mn(OH)_4]^{2-}$, respectively (S. W. Donne, et al., "Redox Processes at the Manganese Dioxide Electrode I. Constant-Current Intermittent Discharge," J. Electrochem. Soc., 144, 2949 (1997)).

In this mechanism, the $2^{nd}$ electron discharge voltage would depend upon the relative solubility of $Mn^{3+}$ and $Mn^{2+}$, and it has been reported (A. Kozawa et al., "Solubilities of Mn(II) and Mn(III) Ions in Concentrated Alkaline Solutions," J. Electrochem. Soc., 113, 405 (1966)) that in the range of 8 M to 10 M KOH solution, the ratio of $Mn^{3+}/Mn^{2+}$ is between 8 and 10.

$$E = E^\circ + \frac{RT}{F} \ln \frac{[Mn^{3+}]}{[Mn^{2+}]}$$

Therefore, it is vital to increase the ratio of $Mn^{3+}/Mn^{2+}$ (increasing $Mn^{3+}$ solubility or decreasing $Mn^{2+}$ solubility) in order to improve the cell open circuit voltage (OCV). To increase the cell closed circuit voltage (CCV), one needs to increase the $Mn^{3+}$ dissolution rate or the $Mn^{2+}$ precipitation rate.

U.S. Patent Application Publication No. US 2015/0155559A1, which is incorporated herein by reference in its entirety, claims a significant second electron discharge capacity in a $MnO_2/Zn$ system. In the patent application, solid ionically conducting polymer was formed from a base polymer, an electron acceptor, and a source of ions, and the cathode was prepared by mixing $MnO_2$ with the solid ionically conducting polymer. The electron acceptor is selected from the group comprising 2,3-Dichloro-5,6-Dicyano-1,4-Benzoquinone (DDQ), Tetracyanoethylene (TCNE), sulfur trioxide or chloranil and combination thereof.

U.S. Pat. No. 9,225,015, which is incorporated herein by reference in its entirety, claims a group of additives added into the electrolyte, rather than solid phase, in a Li-Air battery to increase the charge-discharge efficiency. This patent does not mention $Zn/MnO_2$ or any aqueous systems.

The effects of organic additives shown in FIG. 1 on $Zn/MnO_2$ discharge capacity when the additives are added either into the $MnO_2$ cathode mix or directly into the electrolytes were investigated. No ionically conducting polymer was used in the cathodes studied in this report. The numbers of electrons in the redox reactions in the table include reactions involving chlorine or fluorine such as

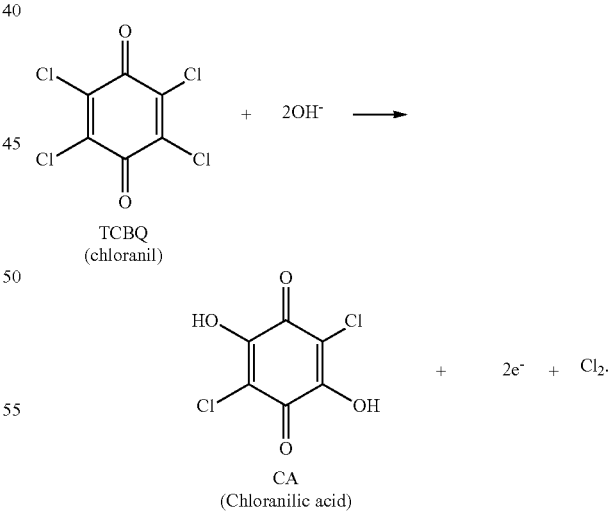

Figure 2:
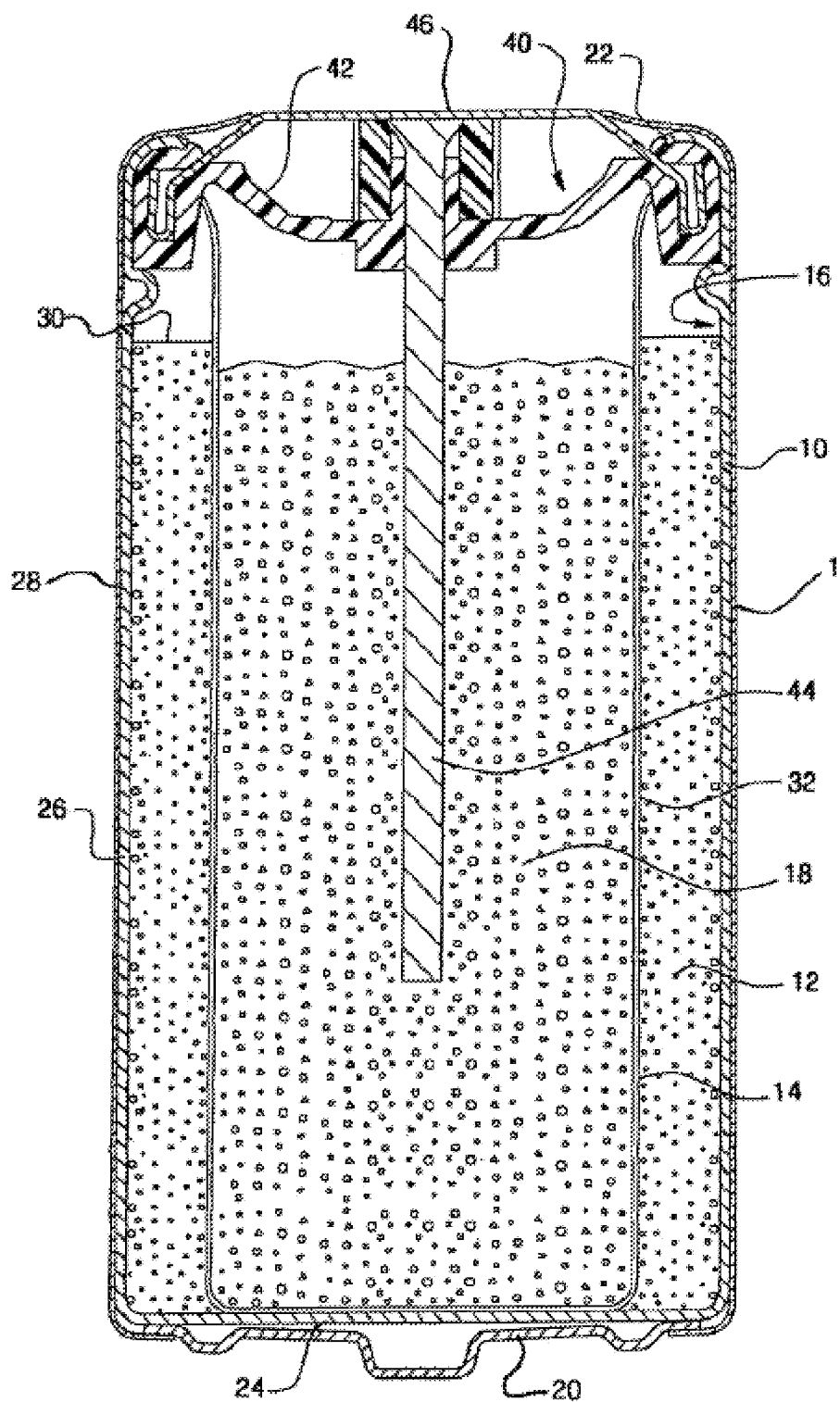
FIG. 2 is a cross-sectional elevational view of an alkaline electrochemical cell of an embodiment.

The embodiments will be better understood by reference to FIG. 2 which shows a cylindrical cell 1 in elevational cross-section, with the cell having a nail-type or bobbin-type construction and dimensions comparable to a conventional LR6 (AA) size alkaline cell, which is particularly well-suited to the embodiments. However, it is to be understood that cells according to the embodiments can have other sizes and shapes, such as a prismatic or button-type shape; and electrode configurations, as known in the art. The materials and designs for the components of the electrochemical cell illustrated in FIG. 2 are for the purposes of illustration, and other materials and designs may be substituted. Moreover, in certain embodiments, the cathode and anode materials may be coated onto a surface of a separator and/or current collector and rolled to form a "jelly roll" configuration.

In FIG. 2, an electrochemical cell 1 is shown, including a container or can 10 having a closed bottom end 24, a top end 22 and sidewall 26 there between. The closed bottom end 24 includes a terminal cover 20 including a protrusion. The can 10 has an inner wall 16. In the embodiment, a positive terminal cover 20 is welded or otherwise attached to the bottom end 24. In one embodiment, the terminal cover 20 can be formed with plated steel for example with a protruding nub at its center region. Container 10 can be formed of a metal, such as steel, preferably plated on its interior with nickel, cobalt and/or other metals or alloys, or other materials, possessing sufficient structural properties that are compatible with the various inputs in an electrochemical cell. A label 28 can be formed about the exterior surface of container 10 and can be formed over the peripheral edges of the positive terminal cover 20 and negative terminal cover 46, so long as the negative terminal cover 46 is electrically insulated from container 10 and positive terminal 20.

Disposed within the container 10 are a first electrode 18 and second electrode 12 with a separator 14 therebetween. First electrode 18 is disposed within the space defined by separator 14 and closure assembly 40 secured to open end 22 of container 10. Closed end 24, sidewall 26, and closure assembly 40 define a cavity in which the electrodes of the cell are housed.

Closure assembly 40 comprises a closure member 42 such as a gasket, a current collector 44 and conductive terminal 46 in electrical contact with current collector 44. Closure member 42 preferably contains a pressure relief vent that will allow the closure member to rupture if the cell's internal pressure becomes excessive. Closure member 42 can be formed from a polymeric or elastomer material, for example Nylon-6,6, an injection-moldable polymeric blend, such as polypropylene matrix combined with poly(phenylene oxide) or polystyrene, or another material, such as a metal, provided that the current collector 44 and conductive terminal 46 are electrically insulated from container 10 which serves as the current collector for the second electrode 12. In the embodiment illustrated, current collector 44 is an elongated nail or bobbin-shaped component. Current collector 44 is made of metal or metal alloys, such as copper or brass, conductively plated metallic or plastic collectors or the like. Other suitable materials can be utilized. Current collector 44 is inserted through a preferably centrally located hole in closure member 42.

First electrode 18 is preferably a negative electrode or anode. The negative electrode includes a mixture of one or more active materials, an electrically conductive material, solid zinc oxide, and a surfactant. The negative electrode can optionally include other additives, for example a binder or a gelling agent, and the like.

Zinc is an example main active material for the negative electrode of the embodiments. Mercury and magnesium may also be used. Preferably, the volume of active material utilized in the negative electrode is sufficient to maintain a desired particle-to-particle contact and a desired anode to cathode (A:C) ratio.

Particle-to-particle contact should be maintained during the useful life of the battery. If the volume of active material in the negative electrode is too low, the cell's voltage may suddenly drop to an unacceptably low value when the cell is powering a device. The voltage drop is believed to be caused by a loss of continuity in the conductive matrix of the negative electrode. The conductive matrix can be formed from undischarged active material particles, conductive electrochemically formed oxides, or a combination thereof. A voltage drop can occur after oxide has started to form, but before a sufficient network is built to bridge between all active material particles present.

Zinc suitable for use in the embodiments may be purchased from a number of different commercial sources under various designations, such as BIA 100, BIA 115. Umicore S. A., Brussels, Belgium is an example of a zinc supplier. In a preferred embodiment, the zinc powder generally has 25 to 40 percent fines less than 75 µm, and preferably 28 to 38 percent fines less than 75 µm. Generally lower percentages of fines will not allow desired DSC service to be realized and utilizing a higher percentage of fines can lead to increased gassing. A correct zinc alloy is needed in order to reduce negative electrode gassing in cells and to maintain test service results.

A surfactant that is either a nonionic or anionic surfactant, or a combination thereof is present in the negative electrode. It has been found that anode resistance is increased during discharge by the addition of solid zinc oxide alone, but is mitigated by the addition of the surfactant. The addition of the surfactant increases the surface charge density of the solid zinc oxide and lowers anode resistance as indicated above. Use of a surfactant is believed to aid in forming a more porous discharge product when the surfactant adsorbs on the solid zinc oxide. When the surfactant is anionic, it carries a negative charge and, in alkaline solution, surfactant adsorbed on the surface of the solid zinc oxide is believed to change the surface charge density of the solid zinc oxide particle surfaces. The adsorbed surfactant is believed to cause a repulsive electrostatic interaction between the solid zinc oxide particles. It is believed that the surfactant reduces anode resistance increase caused by the addition of solid zinc oxide because the adsorbed surfactant on solid zinc oxide results in enhanced surface charge density of solid zinc oxide particle surface. The higher the BET surface area of solid zinc oxide, the more surfactant can be adsorbed on the solid zinc oxide surface.

One example surfactant is DISPERBYK-190 from BYK-Chemie GmbH of Wesel, Germany. The surfactant is present in an amount sufficient to disperse the solid zinc oxide, preferably about 0.00064 to about 0.20 weight percent or more, based on the total weight of the negative electrode. DISPERBYK-190 is believed to be a solution including a water soluble, high molecular weight block copolymer including one or more functional groups, believably at least two different types of functional groups. The surfactant has an anionic/nonionic character due to the respective functional groups thereof. It is further believed that the number average molecular weight of a block copolymer DISPERBYK-190 is greater than 1000 measured utilizing gel permeation chromatography. Water solubility may be offset by the presence of a hydrophobic component if present in the electrode composition. In one embodiment, the surfactant is utilized in an amount from about 10 to about 100 ppm and preferably from about 15 to about 50 ppm of zinc utilized in the negative electrode. It is believed that DISPERBYK-190 does not contain any organic solvents and is, therefore, suitable for aqueous systems. DISPERBYK-190 has an acid value in mg KOH/g of 10 and a density of 1.06 g/ml at 20° C.

The aqueous alkaline electrolyte comprises an alkaline metal hydroxide such as potassium hydroxide (KOH), sodium hydroxide (NaOH), or the like, or mixtures thereof. Potassium hydroxide is preferred. The alkaline electrolyte used to form the gelled electrolyte of the negative electrode contains the alkaline metal hydroxide in an amount from about 26 to about 36 weight percent, for example from about 26 to about 32 weight percent, and specifically from about 26 to about 30 weight percent based on the total weight of the alkaline electrolyte. Interaction takes place between the negative electrode alkaline metal hydroxide and the added solid zinc oxide, and it has been found that lower alkaline metal hydroxide improves DSC service. Electrolytes which are less alkaline are preferred, but can lead to rapid electrolyte separation of the anode. Increase of alkaline metal hydroxide concentration creates a more stable anode, but can reduce DSC service. The organic additives in the electrolyte have a concentration of 100-30000 ppm, or 200-25000 ppm, or 300-20000 ppm, or 400-15000 ppm, or 500-10000 ppm.

A gelling agent is preferably utilized in the negative electrode as is well known in the art, such as a crosslinked polyacrylic acid, such as Carbopol® 940, which is available from Noveon, Inc. of Cleveland, Ohio, USA. Carboxymethylcellulose, polyacrylamide and sodium polyacrylate are examples of other gelling agents that are suitable for use in an alkaline electrolyte solution. Gelling agents are desirable in order to maintain a substantially uniform dispersion of zinc and solid zinc oxide particles in the negative electrode. The amount of gelling agent present is chosen so that lower rates of electrolyte separation are obtained and anode viscosity in yield stress are not too great which can lead to problems with anode dispensing.

Other components which may be optionally present within the negative electrode include, but are not limited to, gassing inhibitors, organic or inorganic anticorrosive agents, plating agents, binders or other surfactants. Examples of gassing inhibitors or anticorrosive agents can include indium salts, such as indium hydroxide, perfluoroalkyl ammonium salts, alkali metal sulfides, etc. In one embodiment, dissolved zinc oxide is present preferably via dissolution in the electrolyte, in order to improve plating on the bobbin or nail current collector and to lower negative electrode shelf gassing. The dissolved zinc oxide added is separate and distinct from the solid zinc oxide present in the anode composition. Levels of dissolved zinc oxide in an amount of about 1 weight percent based on the total weight of the negative electrode electrolyte are preferred in one embodiment. The soluble or dissolved zinc oxide generally has a BET surface area of about 4 m2/g or less measured utilizing a Tristar 3000 BET specific surface area analyzer from Micrometrics having a multi-point calibration after the zinc oxide has been degassed for one hour at 150° C.; and a particle size D50 (mean diameter) of about 1 micron, measured using a CILAS particle size analyzer as indicated above. In a further embodiment, sodium silicate in an amount of about 0.3 weight percent based on the total weight of the negative electrode electrolyte is preferred in the negative electrode in order to substantially prevent cell shorting through the separator during cell discharge.

The negative electrode can be formed in a number of different ways as known in the art. For example, the negative electrode components can be dry blended and added to the cell, with alkaline electrolyte being added separately or, as in a preferred embodiment, a pre-gelled negative electrode process is utilized.

In one embodiment, the zinc and solid zinc oxide powders, and other optional powders other than the gelling agent, are combined and mixed. Afterwards, the surfactant is introduced into the mixture containing the zinc and solid zinc oxide. A pre-gel comprising alkaline electrolyte, soluble zinc oxide and gelling agent, and optionally other liquid components, are introduced to the surfactant, zinc and solid zinc oxide mixture which are further mixed to obtain a substantially homogenous mixture before addition to the cell. Alternatively, in a further preferred embodiment, the solid zinc oxide is predispersed in a negative electrode pre-gel comprising the alkaline electrolyte, gelling agent, soluble zinc oxide and other desired liquids, and blended, such as for about 15 minutes. The solid zinc oxide and surfactant are then added and the negative electrode is blended for an additional period of time, such as about 20 minutes. The amount of gelled electrolyte utilized in the negative electrode is generally from about 25 to about 35 weight percent, and for example, about 32 weight percent based on the total weight of the negative electrode. Volume percent of the gelled electrolyte may be about 70% based on the total volume of the negative electrode. In addition to the aqueous alkaline electrolyte absorbed by the gelling agent during the negative electrode manufacturing process, an additional quantity of an aqueous solution of alkaline metal hydroxide, i.e., "free electrolyte", may also be added to the cell during the manufacturing process. The free electrolyte may be incorporated into the cell by disposing it into the cavity defined by the positive electrode or negative electrode, or combinations thereof. The method used to incorporate free electrolyte into the cell is not critical provided it is in contact with the negative electrode, positive electrode, and separator. In one embodiment, free electrolyte is added both prior to addition of the negative electrode mixture as well as after addition. In one embodiment, about 0.97 grams of 29 weight percent KOH solution is added to an LR6 type cell as free electrolyte, with about 0.87 grams added to the separator lined cavity before the negative electrode is inserted. The remaining portion of the 29 weight percent KOH solution is injected into the separator lined cavity after the negative electrode has been inserted.

Second electrode 12, also referred to herein as the positive electrode or cathode, includes EMD as the electrochemically active material. EMD is present in an amount generally from about 80 to about 86 weight percent and preferably from about 81 to 85 weight percent by weight based on the total weight of the positive electrode, i.e., manganese dioxide, conductive material, positive electrode electrolyte and additives, including organic additive(s), if present. The positive electrode is formed by combining and mixing desired components of the electrode followed by dispensing a quantity of the mixture into the open end of the container and then using a ram to mold the mixture into a solid tubular configuration that defines a cavity within the container in which the separator 14 and first electrode 18 are later disposed. Second electrode 12 has a ledge 30 and an interior surface 32 as illustrated in FIG. 2. Alternatively, the positive electrode may be formed by pre-forming a plurality of rings from the mixture comprising EMD, and optionally, additive(s), and then inserting the rings into the container to form the tubular-shaped second electrode. The cell shown in FIG. 2 would typically include 3 or 4 rings.

The positive electrode can include other components such as a conductive material, for example graphite, that when mixed with the EMD provides an electrically conductive matrix substantially throughout the positive electrode. Conductive material can be natural, i.e., mined, or synthetic, i.e., manufactured. In one embodiment, the cells include a positive electrode having an active material or oxide to carbon ratio (O:C ratio) that ranges from about 12 to about 14. Too high of an oxide to carbon ratio decreases the container to cathode resistance, which affects the overall cell resistance and can have a potential effect on high rate tests, such as the DSC test, or higher cut-off voltages. Furthermore the graphite can be expanded or non-expanded. Suppliers of graphite for use in alkaline batteries include Timcal America of Westlake, Ohio; Superior Graphite Company of Chicago, Ill.; and Lonza, Ltd. of Basel, Switzerland. Conductive material is present generally in an amount from about 5 to about 10 weight percent based on the total weight of the positive electrode. Too much graphite can reduce EMD input, and thus cell capacity; too little graphite can increase container to cathode contact resistance and/or bulk cathode resistance. An example of an additional additive is barium sulfate (BaSO4), which is commercially available from Bario E. Derivati S.p.A. of Massa, Italy. The barium sulfate is present in an amount generally from about 1 to about 2 weight percent based on the total weight of the positive electrode. Other additives can include, for example, barium acetate, titanium dioxide, binders such as coathylene, and calcium stearate.

In one embodiment, the positive electrode component (EMD), conductive material, and barium sulfate, and optionally additive(s) are mixed together to form a homogeneous mixture. During the mixing process, an alkaline electrolyte solution, such as from about 37% to about 40% KOH solution, optionally including organic additive(s), is evenly dispersed into the mixture thereby insuring a uniform distribution of the solution throughout the positive electrode materials. The mixture is then added to the container and molded utilizing a ram. Moisture within the container and positive electrode mix before and after molding, and components of the mix are preferably optimized to allow quality positive electrodes to be molded. Mix moisture optimization allows positive electrodes to be molded with minimal splash and flash due to wet mixes, and with minimal spalling and excessive tool wear due to dry mixes, with optimization helping to achieve a desired high cathode weight. Moisture content in the positive electrode mixture can affect the overall cell electrolyte balance and has an impact on high rate testing.

One of the parameters utilized by cell designers characterizes cell design as the ratio of one electrode's electrochemical capacity to the opposing electrode's electrochemical capacity, such as the anode (A) to cathode (C) ratio, i.e., A:C ratio. For an LR6 type alkaline primary cell that utilizes zinc in the negative electrode or anode and $MnO_2$ in the positive electrode or cathode, the A:C ratio may be greater than 1.32:1, such as greater than 1.34:1, and specifically 1.36:1 for impact molded positive electrodes. The A:C ratio for ring molded positive electrodes can be lower, such as about 1.2:1 to about 1.1:1.

Separator 14 is provided in order to separate first electrode 18 from second electrode 12. Separator 14 maintains a physical dielectric separation of the positive electrode's electrochemically active material from the electrochemically active material of the negative electrode and allows for transport of ions between the electrode materials. In addition, the separator acts as a wicking medium for the electrolyte and as a collar that prevents fragmented portions of the negative electrode from contacting the top of the positive electrode. Separator 14 can be a layered ion permeable, non-woven fibrous fabric. A typical separator usually includes two or more layers of paper. Conventional separators are usually formed either by pre-forming the separator material into a cup-shaped basket that is subsequently inserted under the cavity defined by second electrode 12 and closed end 24 and any positive electrode material thereon, or forming a basket during cell assembly by inserting two rectangular sheets of separator into the cavity with the material angularly rotated 90° relative to each other. Conventional pre-formed separators are typically made up of a sheet of non-woven fabric rolled into a cylindrical shape that conforms to the inside walls of the second electrode and has a closed bottom end.

All of the references cited above, as well as all references cited herein, are incorporated herein by reference in their entireties.

While embodiments have been illustrated and described in detail above, such illustration and description are to be considered illustrative or exemplary and not restrictive. It will be understood that changes and modifications may be made by those of ordinary skill within the scope and spirit of the following claims. In particular, embodiments include any combination of features from different embodiments described above and below.

The embodiments are additionally described by way of the following illustrative non-limiting examples that provide a better understanding of the embodiments and of its many advantages. The following examples are included to demonstrate preferred embodiments. It should be appreciated by those of skill in the art that the techniques disclosed in the examples which follow represent techniques used in the embodiments to function well in the practice of the embodiments, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the embodiments.

EXAMPLES

A thin film test was used in this investigation. In the thin film tests, about 120 um thin cathode electrode is compressed onto a 1" circular Ni mesh collector with a force of 25,000 lbf, and the electrode formed on the Ni mesh has a diameter of 0.75". The electrode was assembled in a Lucite cell and discharged in 5 g of 37 wt % KOH electrolyte. The $MnO_2$ used was Westlake milled EMD, and the cathode mix was prepared with a mortar and pestle. Either Hg/HgO or Zn/ZnO reference electrodes could be used on the thin film tests, but all voltages were reported vs. Zn/ZnO. The conversion between these two reference electrodes is Zn/ZnO potential=Hg/HgO+1.35V. The $MnO_2$ cathode formulation is given in Table 2.

TABLE 2

| Cathode Formulation for the Thin Film Tests | |
|---|---|
| Material | wt % |
| Graphite (GA17) | 13.76% |
| EMD | 82.59% |
| Binder (Coathylene) | 0.65% |
| KOH (45%) | 3.00% |
| Total | 100.00% |

When other materials such as additives or mix of $MnO_2$ and additives are used, the formula was adjusted so that the volume percentages of additive and graphite are constants in all mixes. The cells were soaked for 1.5 hr after the electrolyte was added and were evacuated in a vacuum oven for 2 min after the equilibration time. It has been found that the vacuum evacuation significantly reduces the cell-to-cell variation based on the complex impedance measurements before discharge.

The discharge rate is 1/57 C on the theoretical discharge capacity of the active materials. For $MnO_2$ cathodes, 1/57 C rate is equivalent to 10 mA/g $MnO_2$ assuming the $MnO_2$'s 2 electron capacity is 570 mAh/g. The discharge was carried out on an 8-channel Solartron, and a 5-sec interrupt was given after every 20-min discharge and a 30-min rest was given after every 60 min discharge to observe the voltage recovery.

Pure Additives Discharge

Figure 3:
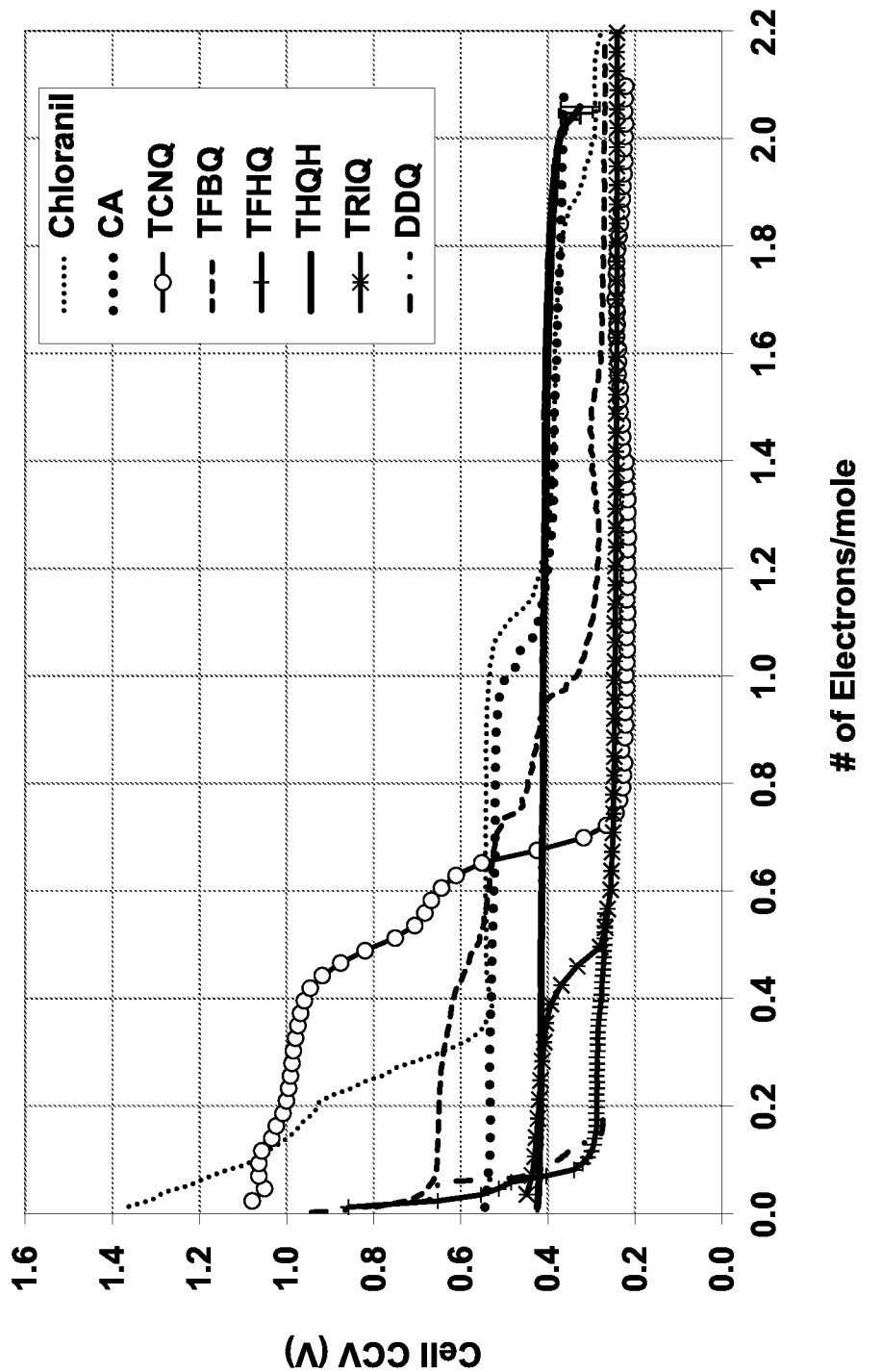
FIG. 3 shows the discharge curves from thin film tests of pure additives (with graphite and binder).

The thin films for "pure" additive include expanded graphite and coathylene binder. Typically, the additives to graphite weight ratio is in the range of 1.8:1 to 3.5:1 depending upon the additive density, because the volume percentage of the graphite in the mixes is a constant (22 v/v %). FIG. 3 shows the thin film test of pure additives (with graphite and binder) discharge curves. From the figure it can be seen that the highest number of electrons from these additives is 2 electrons per mole of the active material. Chloranil started with a high voltage around 1.4 V (vs. Zn/ZnO reference electrode), but it dropped quickly to 0.5 V in which it discharged about 1 electron, then voltage reached to another plateau at 0.4 V. Chloranilic acid (CA) started at 0.5 V, then the voltage dropped to 0.4 V after 1 electron.

The discharge reaction (reduction) of chloranil could be described by the following equation:

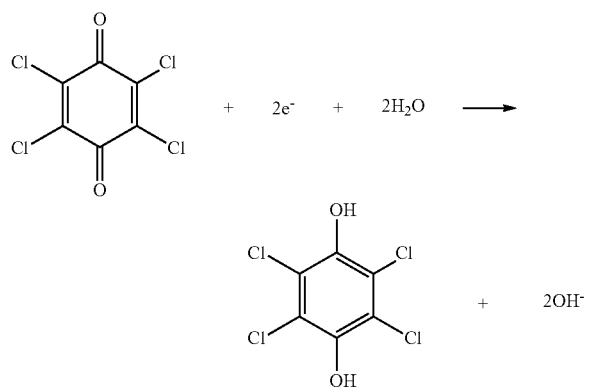

The reduction of chloranilic acid is similar to this equation, with a loss of two C=O bonds.

Instead of a 2-step discharge, Tetrahydroxy-1,4-(benzo) quinone hydrate (THQH) has a flat discharge curve at 0.4 V with a total 2 electrons per mole.

Although 2,3-Dichloro-5,6-Dicyano-1,4-Benzoquinone (DDQ) has a structure similar to that of chloranil, in which two chlorines (Cl) are each replaced with cyano (CN), DDQ released less than 0.2 electrons before the voltage dropped below 0.3 V. The voltage below 0.3 V is the hydrogen evolution reaction, which has been proved by discharging a Ni mesh current collector only.

Another additive, Triquinoyl octahydrate (TRIQ), has a theoretical 6 electron discharge capacity if all six C=O bonds could be hydrogenated. However, the measured capacity is less than 0.5 electrons.

Figure 4:
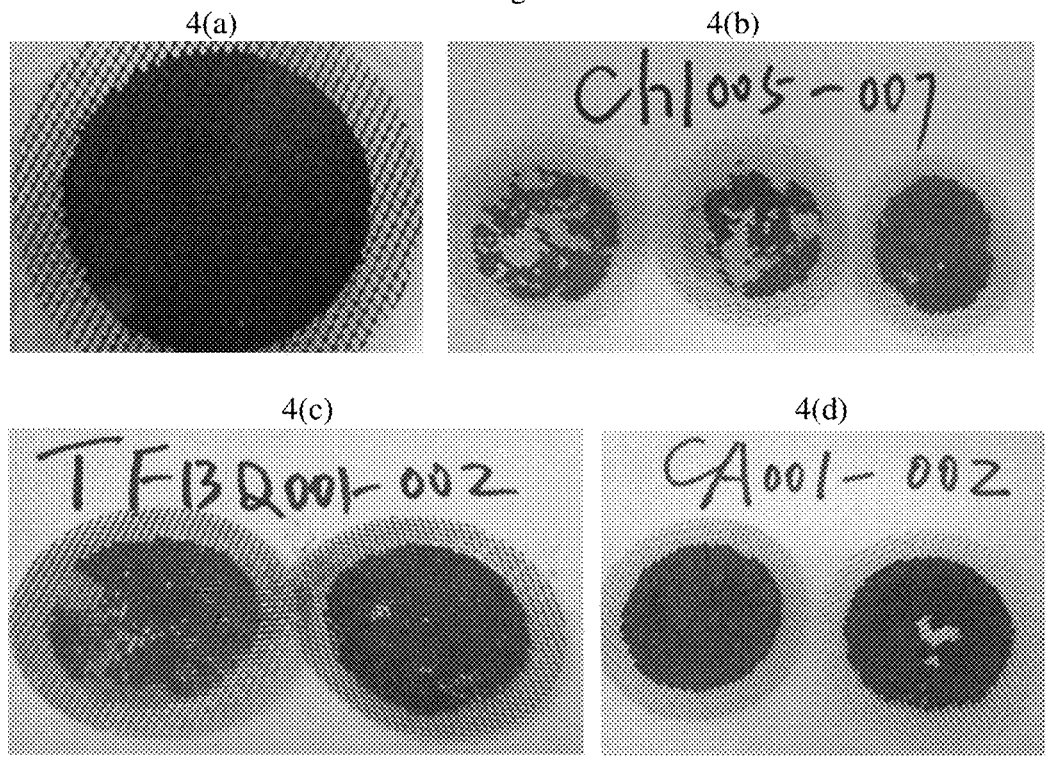
FIGS. 4a)-4d) show photographs of 4a) $MnO_2$, 4b) chloranil, 4c) TFBQ, and 4d) chloranilic acid thin films after discharge.

It has been observed that all these additives are somewhat soluble in KOH solution. The low number of electrons on DDQ and TRIQ could be due to the fact that the additives in the thin films were dissolved, since 5 g of electrolyte was used in each test while the additive weight in each thin film is, at most, 30 mg. This has been supported by the visual inspection of the thin films after tested. The thin films with $MnO_2$ looked intact after discharge as shown in FIG. 4a while the thin films with additives were deteriorated with holes after being tested (FIGS. 4b through 4d), which includes the additives with good discharge capacity, such as CA and chloranil.

Figure 5:
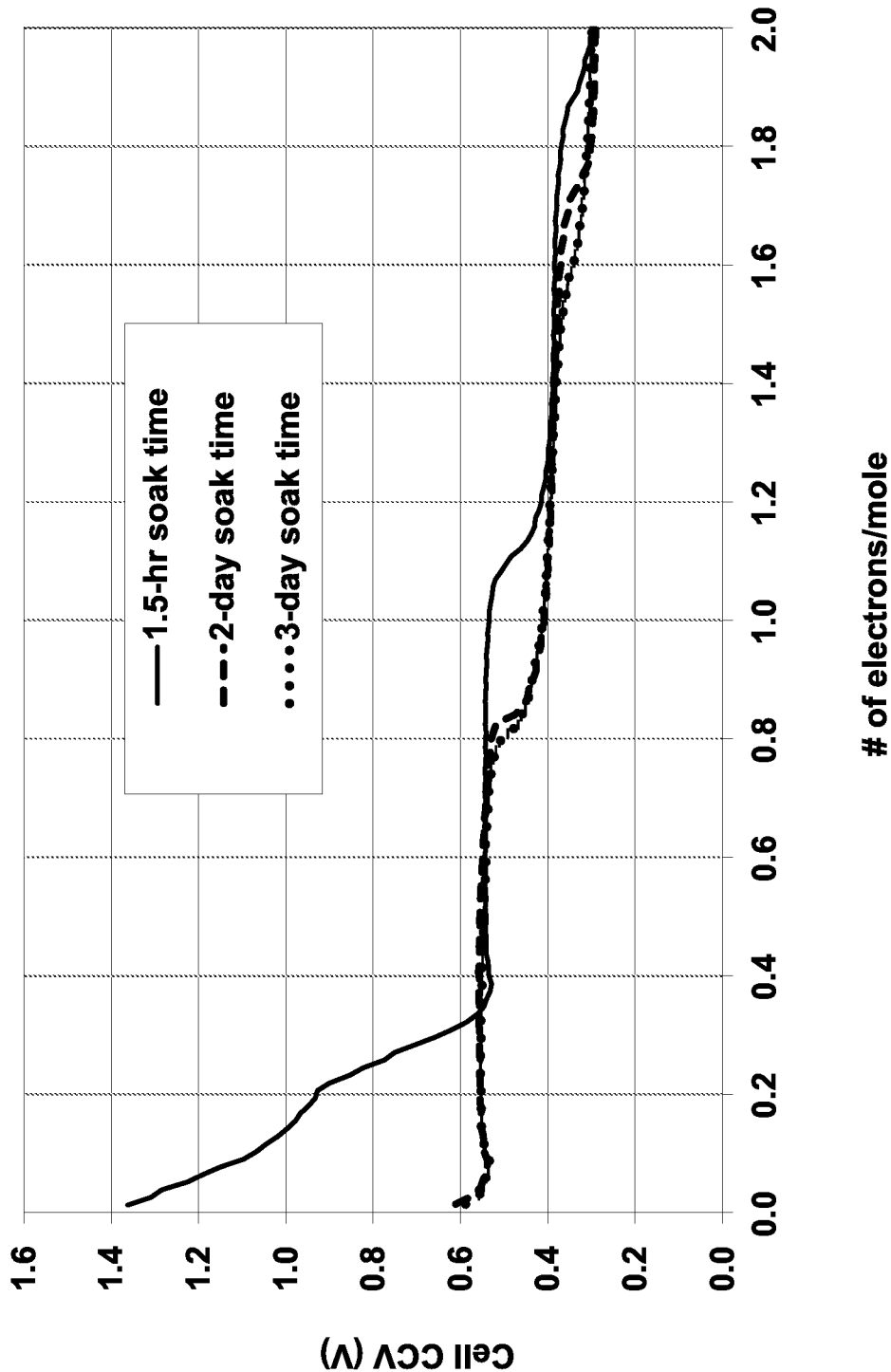
FIG. 5 shows chloranil discharge following different soak times.

The effect of soak time on chloranil discharge capacity was studied by equilibrating the cells for different times after electrolyte was added. FIG. 5 shows that the discharge capacity decreased when the rest time was increased from typical 1.5 hr to 2 days, and no discharge change between 2 and 3 day's rest time.

As shown in the chloranil discharge reaction equation, the discharge products of the quinones are hydroquinones. The hydroquinones could not be further discharged since the hydroquinones have been fully hydrogenated (reduced). When the thin films with hydroquinones such as TFHQ were discharged, very little capacity was observed, as expected (FIG. 3).

Additives in Cathode Mix

Mixes of EMD and some additives were studied to understand the effect of additives on EMD discharge behavior. In the cathode mix with chloranil, the additive to EMD weight ratio is 1:5. No solid ionically conducting polymer was used in the cathodes in this study. The discharge capacity of chloranil is about 7% of the total capacity based on 2 electrons discharge reaction for both chloranil and EMD.

Figure 6:
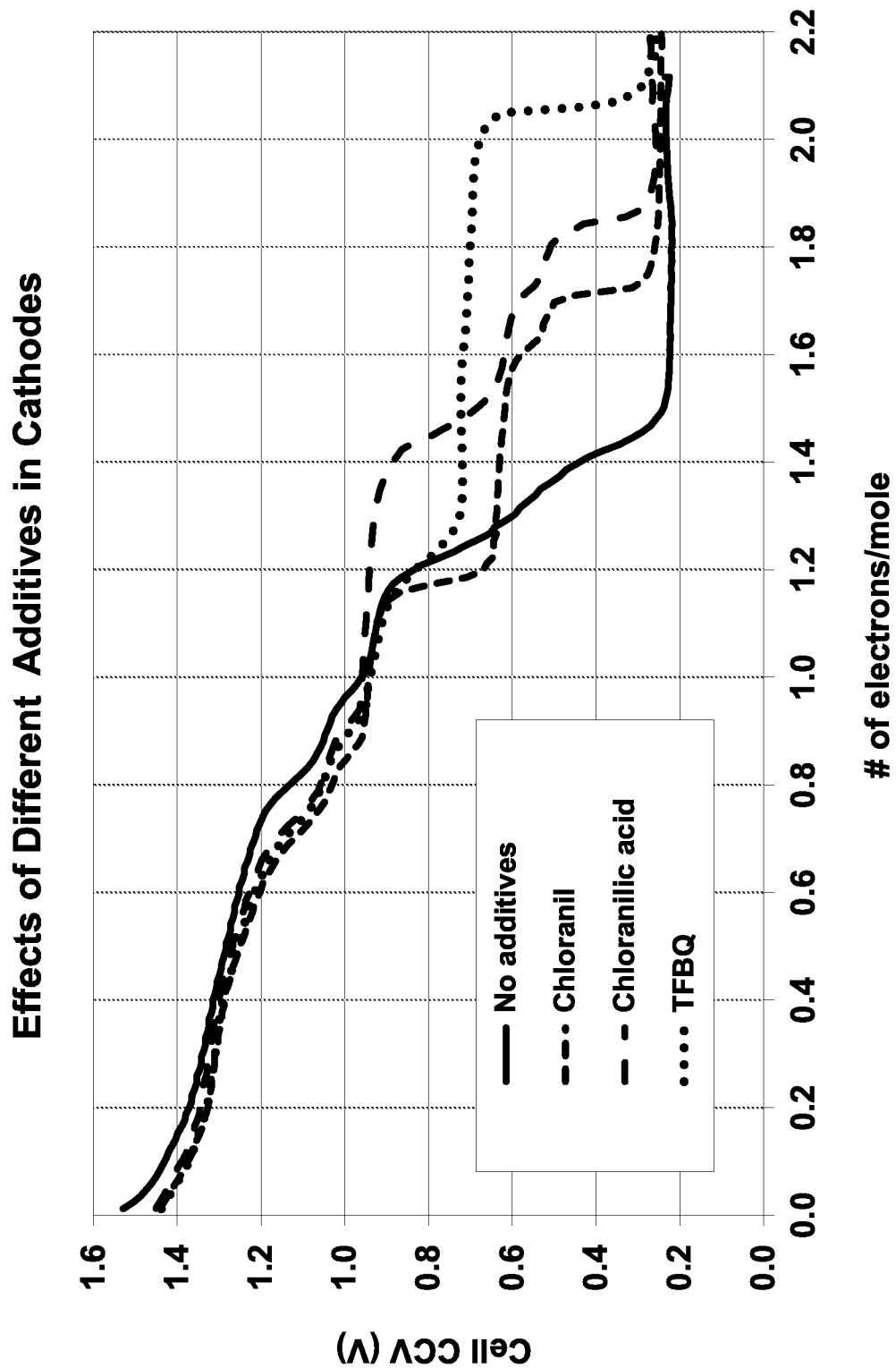
FIG. 6 shows the discharge curves of three additives at 7% (chloranil, chloranilic acid (CA) and tetrafluoro-p-benzoquinone (TFBQ)) in EMD cathode mix in 37% KOH solution.

FIG. 6 shows the discharge curves of three additives at 7% (chloranil, chloranilic acid (CA) and tetrafluro-p-benzoquinone (TFBQ)) in EMD cathode mix. 7% refers to the potential discharge capacity of the corresponding additives relative to the total capacity of the additives and EMD. The weight percentage of the additives in the cathode is in the range of 10% to 13%.

From the figure it can be seen that the presence of additives in EMD significantly increases the discharge capacity beyond 1 electron. The TFBQ enhanced the EMD utilization for a complete 2 electron discharge, but the voltage is only 0.7 V for the last part of the discharge. CA has a higher discharge voltage and it increased the capacity from 1.0 electrons to 1.4 electrons at 0.9 V cutoff voltage.

Additives in Solutions and Separators

As discussed above, the additives investigated here are more or less soluble in the aqueous electrolyte such as KOH solutions. The additives blended with EMD would be dissolved into the solution eventually until saturation. Therefore, adding additives directly into electrolyte should have similar effects on EMD discharge as mixing additive with EMD to form the electrodes.

Figure 7:
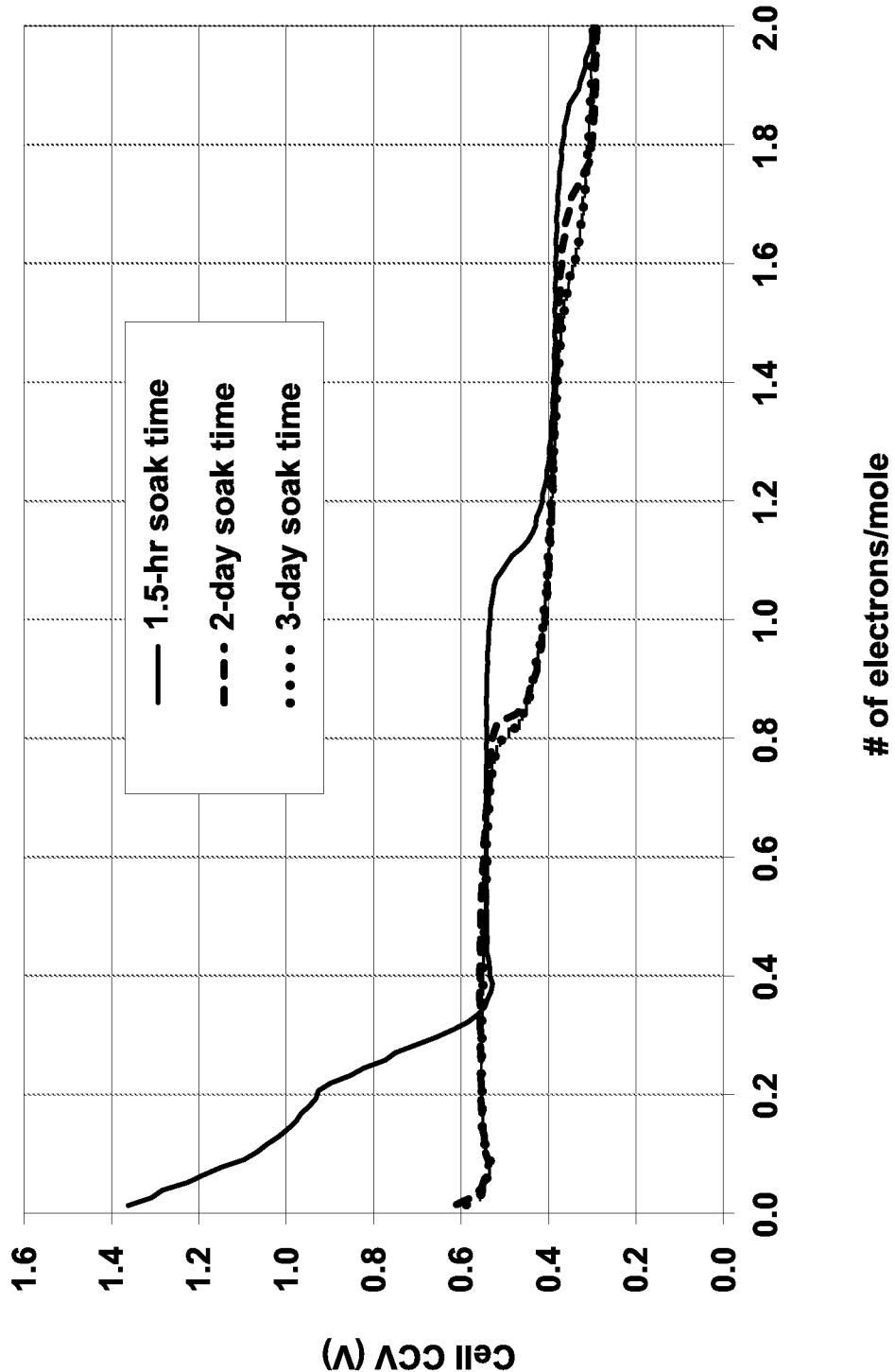
FIG. 7 shows the EMD electrode discharge curve comparison without any additives in electrolytes, with 300 ppm TFBQ added in electrolyte and with 9 mg TFBQ added between two layers of separators.

FIG. 7 shows the EMD electrode discharge curve comparison without any additives in electrolytes, with 300 ppm TFBQ added in electrolyte and with 9 mg TFBQ added between two layers of separators. 9 mg of TFBQ is equivalent to 1800 ppm in solution if it is completely dissolved in the electrolyte since 5 g electrolyte was used in the tests. However, cell autopsy after test shows that the TFBQ between separators was not completely dissolved. From the figure it can be seen that the 300 ppm TFBQ in the electrolyte extended the EMD discharge capacity from 1.3 electrons to 1.6 electrons at 0.7 V. 9 mg TFBQ added between separators extended the discharge to a complete 2 electrons capacity at 0.7 V. Furthermore, 300 ppm TFHQ shows very similar effects on EMD discharge as 300 ppm TFBQ, TFBQ is an oxidized form of TFHQ via the following reaction:

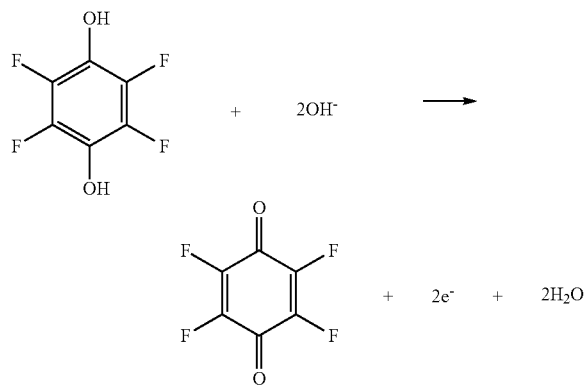

Figure 8:
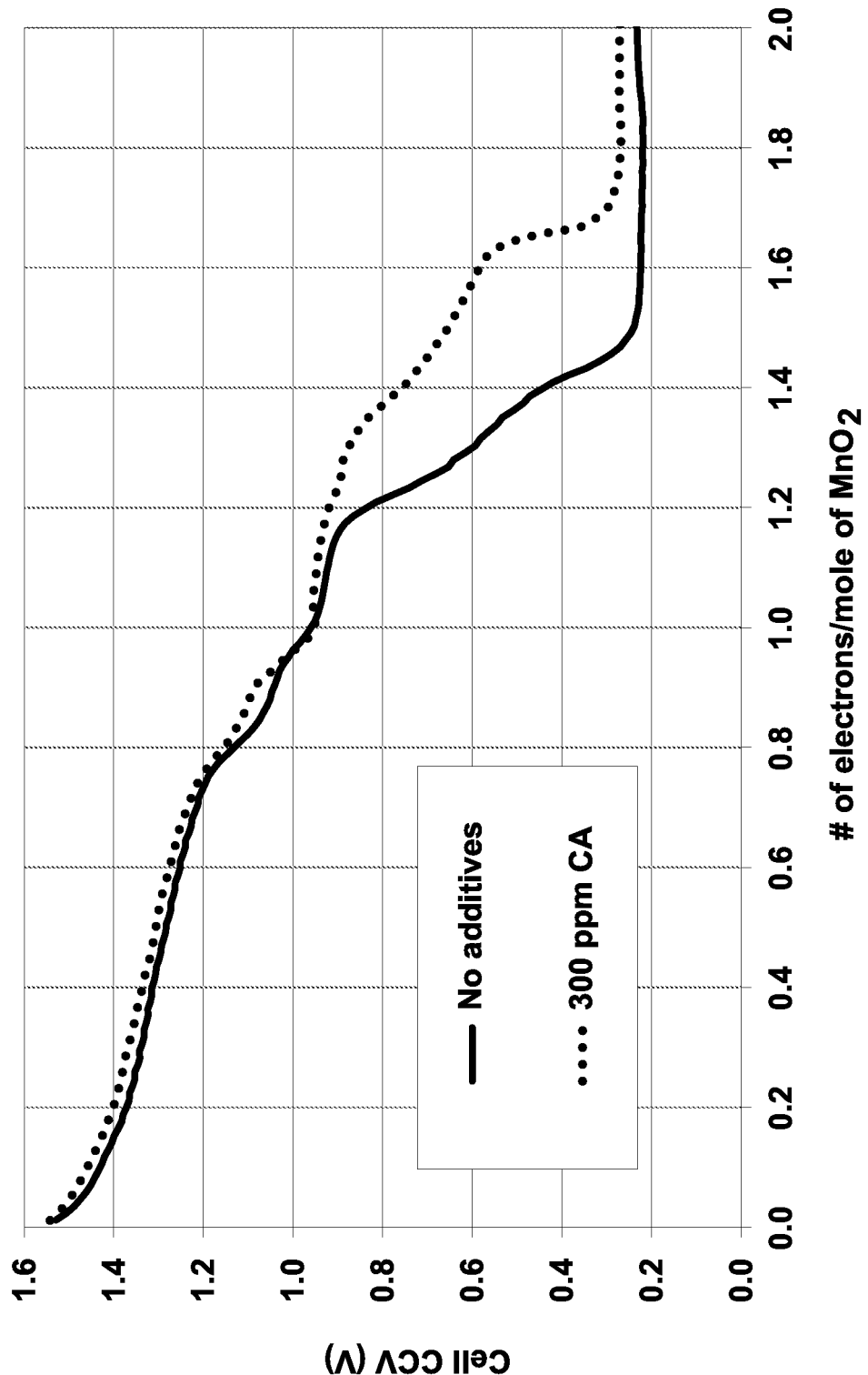
FIG. 8 shows the effect of 300 ppm CA on EMD discharge.

Chloranilic acid (CA) was also investigated in this series of experiments. When 300 ppm were added into electrolyte, EMD cathodes were discharged further than the non-additive control (FIG. 8). The voltage with 300 ppm CA doesn't extend the discharge curve as far as 300 ppm TFBQ, but the voltage with CA is a little bit higher than that with TFBQ between 1.0 and 1.4 electrons.

At this moment, the mechanisms of the additives on EMD discharge are not clear. One speculated reason is that the additives were discharged as cathode materials, because they can be electron acceptors. However, at least three observations indicate that this hypothesis may be incorrect.

First, the capacity extended in the presence of additives is much more than the capacity possibly contributed by the additives. For example, 300 ppm TFBQ in 5 g electrolyte can only contribute about 0.02 electrons in FIG. 7 while the extra capacity observed is 0.3 electrons in the figure.

Second, the voltage of the extra capacity from the cathode with additives is higher than the voltage of the pure additives (FIG. 3). For example, the discharge capacity of pure CA is only 0.5 V (FIG. 3) while the voltage of the extended capacity with 1,200 ppm is about 0.9 V.

Third, hydroquinones such as TFHQ are in the reduced forms and they are not electron acceptors, however, TFHQ showed same effects on EMD discharge as TFBQ. This further proves that the extra capacity observed with additives is not from the reduction reaction of the additive themselves.

Figure 9:
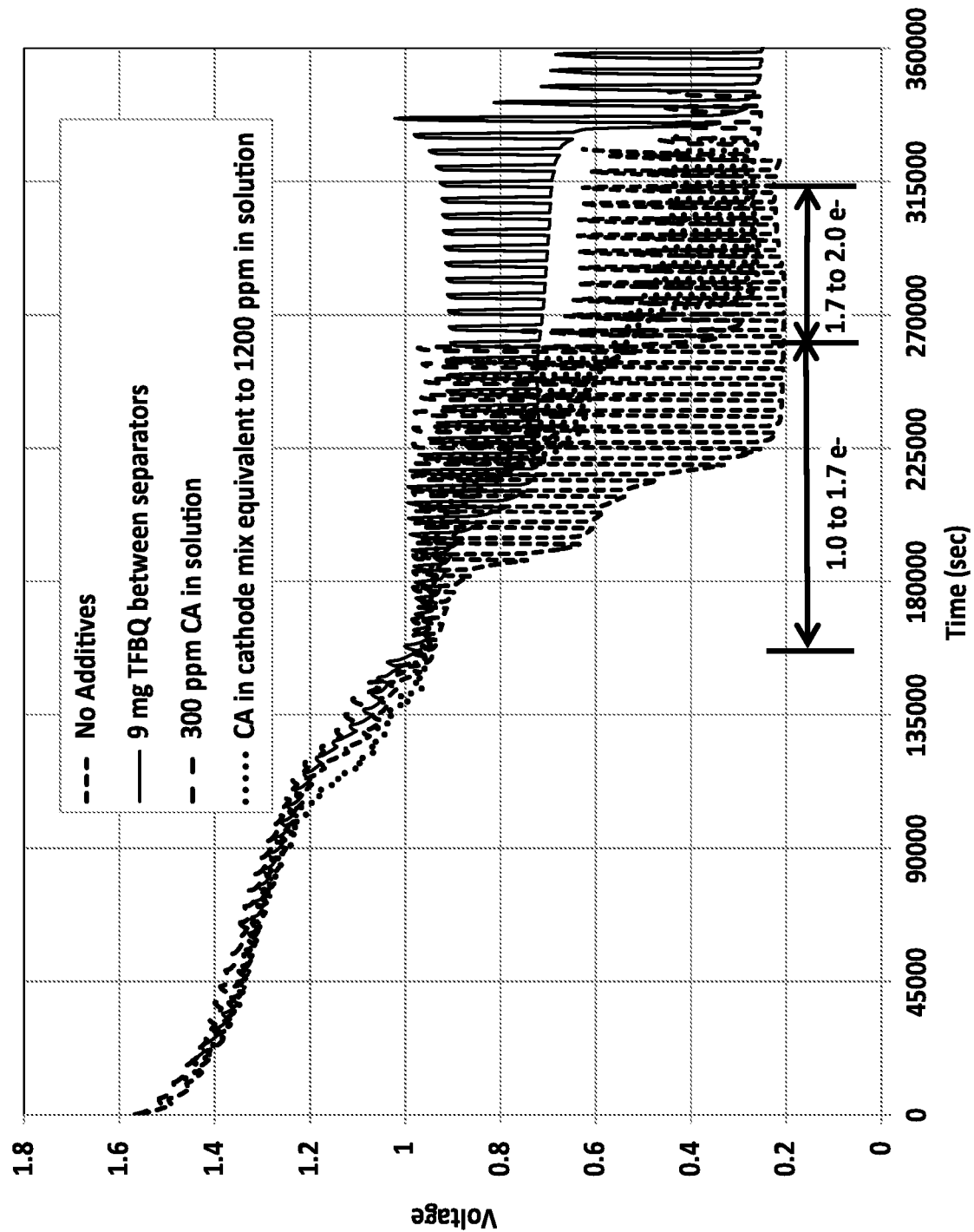
FIG. 9 shows discharge curves with recovery voltage for 9 mg TFBQ between separators, 300 ppm CA in solution, CA in cathode mix equivalent to 1200 ppm in solution, and a cathode without organic additive.

Another possibility is that the presence of the additives increases the solubility of $Mn^{3+}$ and/or decreases the solubility of $Mn^{2+}$, and consequently increases the OCV by increasing the $Mn^{3+}/Mn^{2+}$ ratio in solution according to the $Mn^{3+}/Mn^{2+}$ ratio equation shown above. However, the recovery voltage during the 30-min rest after every 1 hr discharge in FIG. 9 shows that the presence of additives does not have much impact on OCV between 1.0 and 1.7 electrons. The high discharge capacity with additives is due to the reduced polarization. Therefore, it is likely that the additives in the electrolyte increase the dissolution rate of $Mn^{3+}$ or the precipitation rate of $Mn^{2+}$ by changing the solid reaction product morphology such as surface area.

Figure 10:
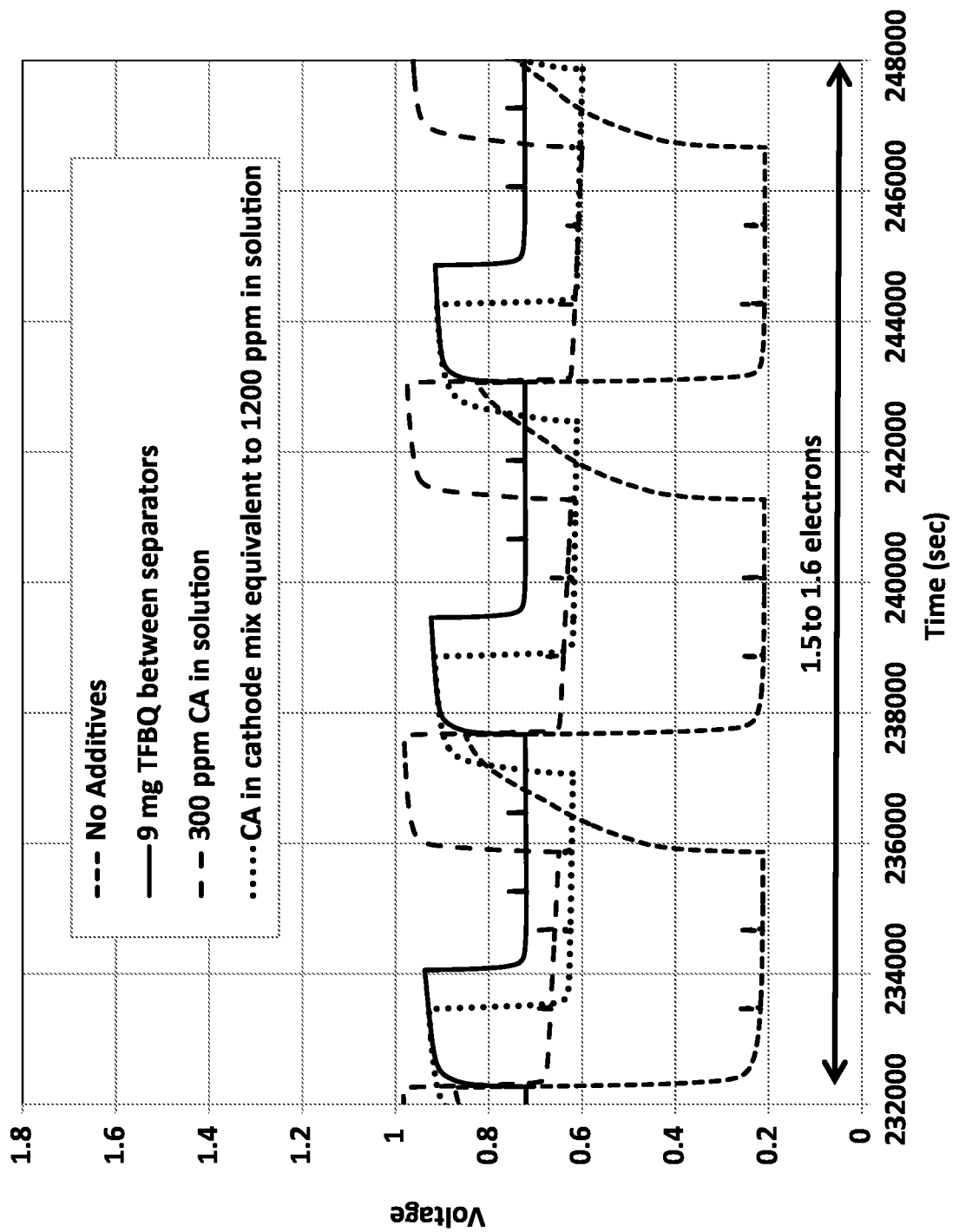
FIG. 10 is a closer examination of the voltage recovery shown in FIG. 9, between 1.5 and 1.6 electrons.
Figure 11:
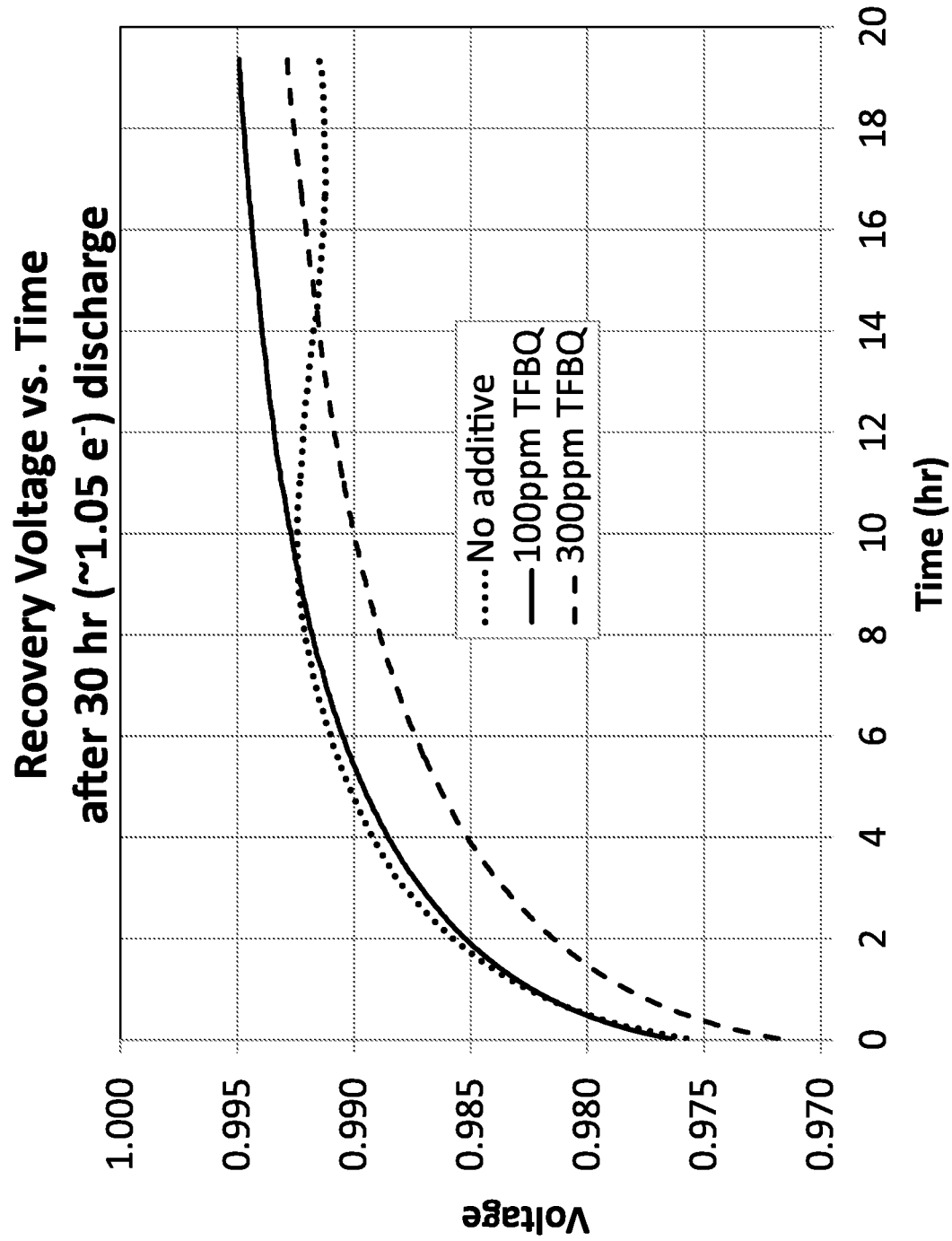
FIG. 11 shows recovery voltage vs. time after a 30 hour, approximately 1.05 electron discharge, for 100 ppm TFBQ and 300 ppm TFBQ additive in electrolyte solution, and for electrolyte solution without organic additive.

A closer examination of recovery voltage in FIG. 10 between 1.5 and 1.6 electrons shows that the voltage recovery is faster with additives than without additives. The voltage recovery after 1.05 electron discharge was monitored with and without TFBQ for 20 hour, and the results, shown in FIG. 11, demonstrate that all three cells had a similar recovery rate up to 10 hours. However, the cells with 100 and 300 ppm TFBQ kept recovering after 10 hrs, but the voltage of the control cell without additive leveled off after 10 hr. Another interesting observation in FIG. 9 is that 30-min recovery voltage with TFBQ beyond 1.7 electrons doesn't decrease with further discharge; instead, it increases slightly. More long term recovery voltage will be studied after the electrodes are discharged to 1.5 electrons or higher to understand equilibrium voltage behavior with and without additives.

Many modifications and other embodiments will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims and list of embodiments disclosed herein. Although specific terms are employed herein, they are used in a generic and descriptive sense only and not for purposes of limitation. For the embodiments described in this application, each embodiment disclosed herein is contemplated as being applicable to each of the other disclosed embodiments.

What is claimed is:

1. An alkaline electrochemical cell, comprising:
   a) a container; and
   b) an electrode assembly disposed within the container and comprising a cathode, an anode, a separator located between the cathode and the anode, an alkaline electrolyte solution, and an additive which is an organic additive or sulfur trioxide;
   wherein the organic additive is a quinone, a hydroxyquinone, a triquinoyl, a hydroquinone, tetracyanoethylene (TCNE), 1,3-benzenediol, or 2,3-dihydroxybenzoic acid; and
   wherein the electrochemical cell does not comprise an ionically conducting polymer.

2. The alkaline electrochemical cell of claim 1, wherein the additive is selected from the group consisting of 2,3-Dichloro-5,6-Dicyano-1,4-Benzoquinone (DDQ), tetracyanoethylene (TCNE), sulfur trioxide, chloranil, chloranilic acid (CA), tetrafluoro-p-benzoquinone (TFBQ), triquinoyl octahydrate (TRIQ), tetrahydroxy-1,4-(benzo)quinone hydrate (THQ), 1,4-benzoquinone (BQ), hydroquinone (HQ), tetrachlorohydroquinone (TCHQ), tetrafluorohydroquinone (TFHQ), 2,3-dihydroxybenzoic acid, 1,3-benzenediol, and combinations thereof.

3. The alkaline electrochemical cell of claim 1, wherein the additive is selected from the group consisting of CA, chloranil, and TFBQ, and combinations thereof.

4. The alkaline electrochemical cell of claim 1, wherein the cathode comprises the additive.

5. The alkaline electrochemical cell of claim 1, wherein the anode comprises the additive.

6. The alkaline electrochemical cell of claim 1, wherein the electrolyte solution comprises the additive.

7. The alkaline electrochemical cell of claim 1, wherein the separator comprises the additive.

8. The alkaline electrochemical cell of claim 1, wherein the electrochemical cell is a primary cell.

9. The alkaline electrochemical cell of claim 1, wherein the electrochemical cell is a secondary cell.

10. The alkaline electrochemical cell of claim 1, wherein the cathode or the anode comprises the additive in a concentration of 6 wt %- 50 wt %.

11. The alkaline electrochemical cell of claim 1, wherein the electrolyte solution comprises the additive in a concentration of 100-30000 ppm.

12. The alkaline electrochemical cell of claim 1, wherein the anode comprises an active material selected from the group consisting of zinc, magnesium, aluminum, and silicon.

13. The alkaline electrochemical cell of claim 1, wherein the electrochemical cell has a specific capacity or runtime that is greater than that of a similar alkaline electrochemical cell which lacks the additive.

14. A method of producing the electrochemical cell of claim 4, comprising the step of blending the additive with cathode mix prior to forming the cathode.

15. A method of producing the electrochemical cell of claim 5, comprising the step of adding the additive into anode dry mix or anode paste prior to forming the anode.

16. A method of producing the electrochemical cell of claim 6, comprising the step of mixing the additive with an electrolyte or the electrolyte solution.

17. A method of producing the electrochemical cell of claim 7, comprising the step of
dipping a separator in additive solution; or
placing additive powder between layers of separator.

18. The alkaline electrochemical cell of claim 1, wherein the additive is sulfur trioxide.

19. The alkaline electrochemical cell of claim 1, wherein the additive is a hydroxyquinone, a triquinoyl, a hydroquinone, tetracyanoethylene, 1,3-benzenediol, or 2,3-dihydroxybenzoic acid.

20. The alkaline electrochemical cell of claim 2, wherein the additive is selected from the group consisting of tetracyanoethylene (TCNE), chloranilic acid (CA), tetrafluoro-p-benzoquinone (TFBQ), triquinoyl octahydrate (TRIQ), tetrahydroxy-1,4-(benzo)quinone hydrate (THQ), 1,4-benzoquinone (BQ), hydroquinone (HQ), tetrachlorohydroquinone (TCHQ), tetrafluorohydroquinone (TFHQ), 2,3-dihydroxybenzoic acid, 1,3-benzenediol, and combinations thereof.

21. The alkaline electrochemical cell of claim 19, wherein the additive is selected from the group consisting of CA and TFBQ.

22. The alkaline electrochemical cell of claim 19, wherein the additive is CA.

23. The alkaline electrochemical cell of claim 19, wherein the additive is TFBQ.

* * * * *